May 3, 1966  E. G. VANDERLIP  3,249,323
CLOSURE FOR VTOL AIRCRAFT

Filed April 25, 1962  3 Sheets-Sheet 1

INVENTOR.
EDWARD G. VANDERLIP
BY William E. Cleaver

ATTORNEY

INVENTOR.
EDWARD G. VANDERLIP

United States Patent Office 3,249,323
Patented May 3, 1966

3,249,323
CLOSURE FOR VTOL AIRCRAFT
Edward G. Vanderlip, Wayne, Pa., assignor, by mesne assignments, to Piasecki Aircraft Corporation, Philadelphia, Pa., a corporation of Pennsylvania
Filed Apr. 25, 1962, Ser. No. 190,162
The portion of the term of the patent subsequent to Mar. 19, 1982, has been disclaimed
10 Claims. (Cl. 244—12)

This invention relates to aircraft and more particularly to means to provide vertical take-off and landing capability for airplanes which normally require forward speed to generate lift.

The conventional fixed-wing type airplane, in general, is a very fast and efficient means of transportation; however, the utility and usefulness of this type of aircraft could be greatly increased if means were provided to enable such aircraft to readily execute vertical take-off and landings as well as hovering, in helicopter fashion, without being encumbered by the disadvantages of a helicopter.

Accordingly it is an object of this invention to provide a means to enable a conventional horizontal flying aircraft to be readily transformed into a vertical take-off and landing type aircraft.

It is a further object of this invention to provide a lifting system which can be used in a conventional type airplane to permit it to hover, land and take-off in helicopter fashion without materially affecting its normal forward flight characteristics.

Another object of this invention is to provide a means for reducing ram drag generated by the vertical lift system during the transition from vertical flight to horizontal flight.

Another object of this invention is to provide for more advantageous longitudinal positioning of the center of lift of the airplane.

A further object of this invention is to provide a large ratio of fan area to total wing area.

In accordance with a feature of the present invention there is provided a movable upper closure member which fits over the duct inlet of each submerged ducted-rotor device thereby forming a smooth continuous airfoil surface with the wing or body surfaces adjacent to said duct inlet.

In accordance with another feature of the present invention a groove is provided at the forward edge of each duct inlet opening, and said upper closure member is formed to snugly fit into said groove.

In accordance with another feature of the present invention there is provided means to lift (during flight) said upper closure member, up and away from the duct inlet, a different distance at the leading edge than at the trailing edge and to lower (during flight) said upper closure to cover said duct opening.

In accordance with another feature of the present invention, said upper closure member has a center portion which is opened when said upper closure member is being held up and away from the wing in order to increase the airflow through the rotor duct (thereby preventing choking the airflow) and to equalize the air pressure on the top and bottom of said upper closure member during vertical take-off or landing of the aircraft.

In accordance with another feature of the present invention, there is provided a lower closure device comprised of a set of louver means or vanes, operably connected to the lower side of the duct structure, which when opened enable a vertical lift to be effected (in combination with an open upper closure) and which when closed form a smooth lower surface with the aircraft surfaces adjacent to the lower side of said duct opening.

In accordance with another feature associated with the submerged ducted-rotor structure there is provided an operable flap mounted rearward of the submerged ducted-rotor, for instance a wing-trailing-edge flap in the fan-in-wing embodiment.

Figure 1:
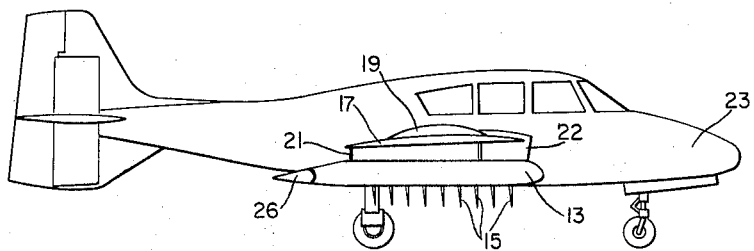
FIG. 1 depicts an airplane which employs the present invention.

In general the present invention operates to readily and smoothly convert a conventional horizontal flying airplane having a submerged ducted-rotor from a vertical flying mode into a conventional horizontal flying mode and vice versa. In a submerged ducted-rotor aircraft there is provided a cylindrical opening whose axis is vertical and in which there is housed a thrust producing system including the rotary mechanism, or rotary-wing members. The engine, or engines, may also be housed within this opening. The inner structure of this cylindrical opening is a shroud, or duct, which is fabricated of metal or some other suitable material. Such an arrangement is fully described in my copending application entitled "Rotary Wing Aircraft," Serial No. 144,710, filed October 12, 1961.

Assuming that the submerged rotors of the above-described aircraft are not in powered motion and there are no duct closures, and assuming further that it is desirable to move such a submerged ducted-rotor aircraft in horizontal flight at relatively high speeds, the duct opening becomes detrimental. This detrimental effect is true in the first instance, because as the air flows over the lower surface of that portion of the body which houses the submerged ducted-rotor (for instance the wing in one embodiment) it intersects the opening thereof and the lift from positive pressure on the undersurface which would normally result from air flow is diminished. In addition, the air flowing over the upper surface of that portion of the body which houses the submerged ducted-rotor intersects the upper opening thereof and the resultant air flow separation at the duct opening causes a substantial amount of turbulence and a consequential loss of lift.

In order to overcome these undesirable characteristics, the present invention provides an upper closure member on the top surface which covers the opening of the submerged ducted-rotor structure. This upper closure member has a contour which substantially conforms with the upper surface of that portion of the body which is adjacent to the opening of the submerged ducted-rotor structure.

In one embodiment the leading edge of the upper closure is formed somewhat like a knife-edge, which is made to fit into a groove in the upper surface of the body forward of the duct opening. For instance, in a fan-in-wing embodiment (submerged ducted-rotor being located in the wing), this last-described knife-edge arrangement provides for an overlap of the wing over the upper closure at the leading edge thereof. The combination of the knife-edge and the groove provides a unique closure-locking arrangement which provides an advantage in horizontal flight. As the air flows over the upper surface of the wing with the upper closure thus locked down there is no discontinuity in the air flow at the juncture of the upper closure and the wing. When the upper closure is moved up and away from the wing in order to permit vertical air flow through the duct (to effect vertical take-off, or vertical landing, or hovering) the trailing edge thereof is lifted up first, thus lifting the leading edge of the upper closure out of the groove and clear of the upper edge of the groove. Thereafter the leading edge of the upper closure is lifted up and away from the wing.

The upper closure member is finally positioned with its leading edge further away from the wing, or higher above the wing (relative to the wing chord), than its trailing edge. Such positioning of the upper closure when in flight provides "additional" lift from the upper closure as will be discussed more fully hereinafter.

Within the center of the upper closure there is an operable cut-out portion which can opened to enable substantially all the air flow which would normally pass through the rotor duct to actually pass therethrough. If the opening were not provided, the air flow would be choked and the vertical thrust would be diminished. Further, if the center opening were not provided the air flowing on the lower surface of the upper closure would effect a reduced air pressure thereat and would reduce effective lift of the rotary wing or fan. In other words, even though the rotors would be providing a vertical thrust, the differential in air pressure between the top surface of the upper closure and the bottom surface of the upper closure would result in a force opposing the vertical thrust of the fans. The center opening, however, equalizes the pressure due to horizontal air flow on the top surface and on the bottom surface of the upper closure and hence minimizes or eliminates the force (due to the pressure differential) which opposes the vertical thrust. The center opening of the upper closure more importantly prevents the choking of the rotors and enables the normal vertical thrust to be obtained even though the upper closure is present.

The present invention also provides for louvered means on the lower surface of the wings. The louvered sections are fully opened when the aircraft is executing vertical flight, such as vertical take-off, hovering or vertical landing. The louver vanes are partially opened when the aircraft is in transition from vertical to horizontal flight, or vice versa. During this transition portion of flight a component of force is produced by the action of the air passing through the duct on the inclined vanes to produce forward thrust which introduces acceleration of the aircraft in the direction of normal forward flight. When the aircraft has achieved horizontal flight at the end of a take-off and transistion maneuver, i.e., when it can be sustained in flight by aerodynamic forces the louver means are closed and remain so during normal horizontal flight.

Further, the present invention employs flaps, which are deployed at large deflection angles, to great advantage. The ducted fan system when in motion has a tendency to move the center of lift forward thereby causing a nose-up pitching moment. With the flaps deployed there is a compensating nose-down pitching moment introduced which provides a resultant center of lift substantially close to the center of the ducted fan system.

Figure 2:
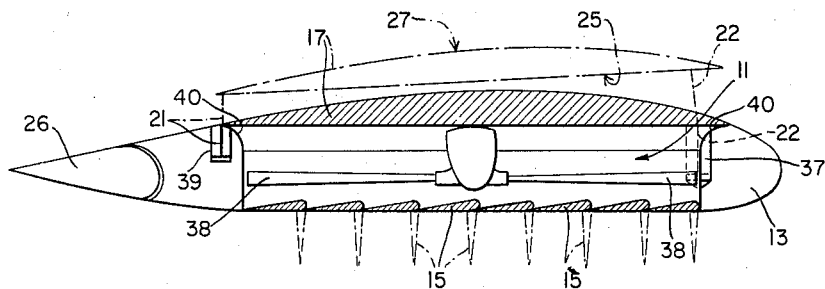
FIG. 2 is a partial sectional view of a wing employing the present invention.

Keeping in mind the above general operation, examine the figures, and first, in particular, FIGURES 1 and 2. FIGURE 1 shows a fan-in-wing aircraft of the type with which the present invention is employed. While the opening 11 in the wing 13 is not seen in FIGURE 1, the general arrangement of the louvers 15, the upper closure 17, and the upper closure cut-out 19, can be seen in FIGURE 1. A preferred position of the drive rods 21 and 22 is also seen in FIGURE 1. When the aircraft 23 takes off vertically, air is forced through the opening 11 (as can be seen in FIGURE 2), and past the open louvers 15. The air is pulled between the lower surface 25 (FIGURE 2) of the upper closure 17 and the upper surface of wing 13 and then through opening 11 to be acted upon by the rotor to effect the vertical thrust.

Figure 3A:
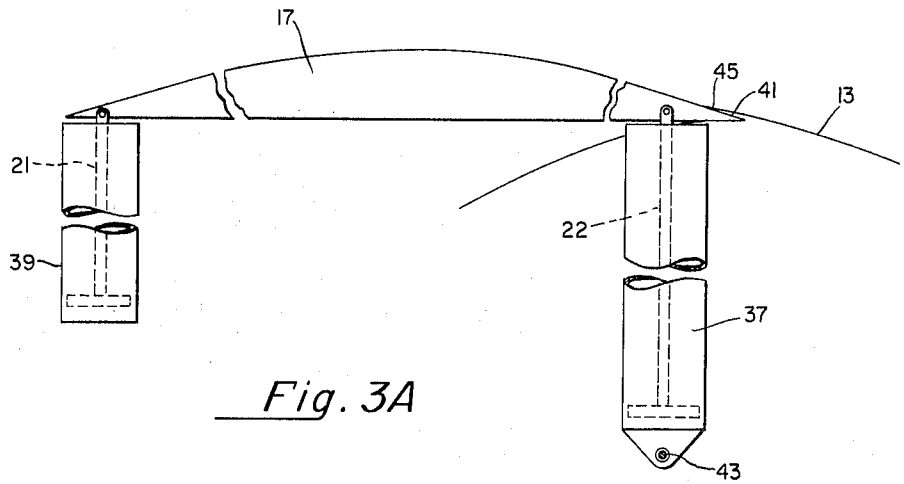
FIGS. 3A, 3B and 3C are three schematic illustrations showing how the upper closure is lifted up and away from the wing.

Consider now the operation and movement of the upper closure 17. FIGURE 3A shows the upper closure 17 in its closed position. The groove 41, shown in FIGURE 3A, is a feature of this invention which represents one method of locking down the upper closure in horizontal flight. It is particularly useful where there is some lateral curvature of the body ahead of the ducted-rotor structure (such as on a fan-in-fuselage embodiment or on some fan-in-wing embodiments).

Figure 3B:
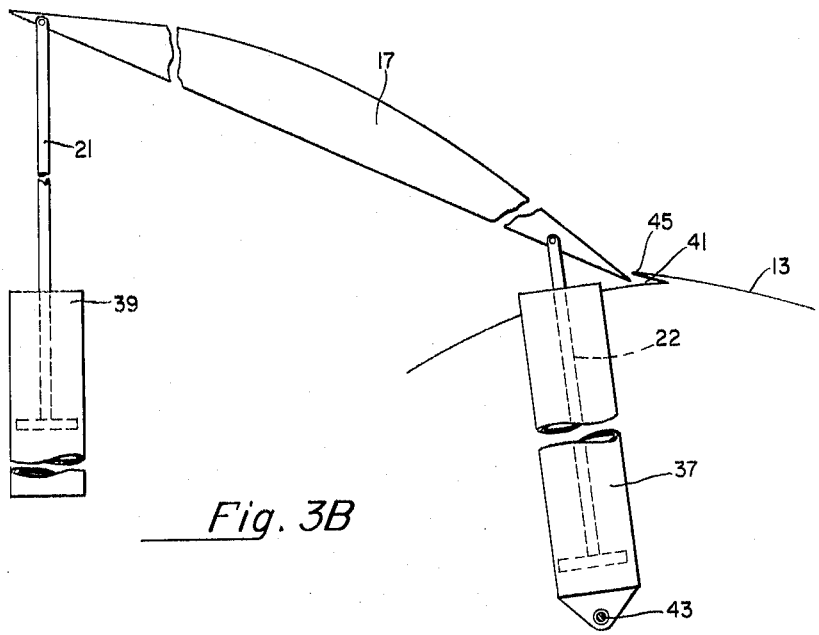
Figure 3C:
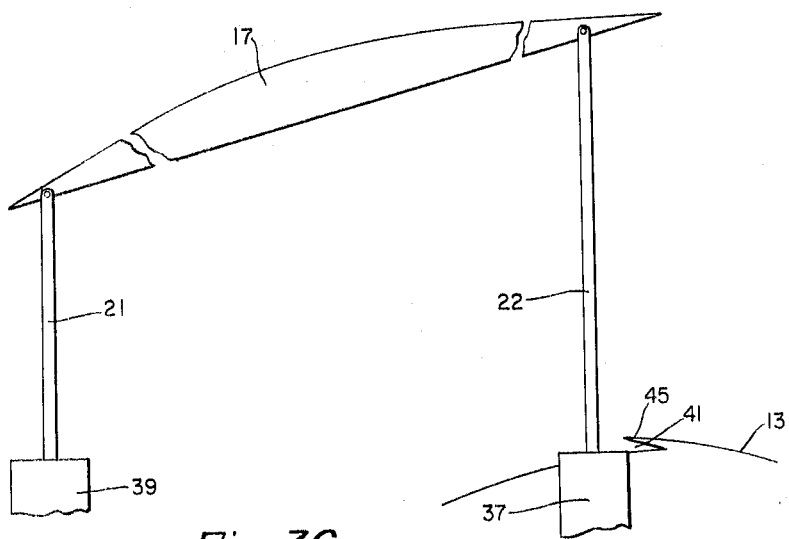

The groove 41, as is indicated in FIGURE 3A, is approximately .040 inch wide. Obviously FIGURE 3A is not drawn to scale in order that the operation of the upper closure into and out of the groove can be presented. As suggested earlier, although hydraulic devices 37 and 39 are shown in FIGURES 3A, 3B and 3C, it should be recognized that other types of power such as electric motors might be used.

When the upper closure 17 is to be lifted up and away from the wing 13 (as shown in FIGURE 3A) the rear driving means 39 drives the trailing edge of the upper closure first. As the trailing edge is lifted, the upper closure 17 is pulled out of the groove 41 to the point where it is clear of the overlap 45. This movement is possible because the forward driving means 37 can be rotated or moved on the joint means 43, whereas the rear driving means 39 is held stationary.

It should be understood that in embodiments of the VTOL aircraft, wherein the spanwise elements of the wing (for fan-in-wing types) or the body (for fan-in-fuselage types) are essentially straight lines, the locking feature described above is not required and a simple arrangement of a flush mating of the bottom of the upper closure 17 and the top of the wing 13 (adjacent to the duct opening), is satisfactory. In such embodiments (not requiring the locking feature), the necessity of raising the trailing edge of the upper closure first, as a prerequisite to positioning the upper closure for proper functioning in transition and hovering flight, is not necessary.

Because of the limited space between the upper closure 17 and the wing 13 the airflow through the opening 11 would normally become choked. In other words, as the rotors 38 rotate the air acted on is forced down through the louvers 15 and more air rushes in to replace the air thus removed. If the available air is limited or blocked by the narrow space between upper closure 17 and the wing 13, the rotors 38 fail to pull the amount of air they should and hence are choked (consequently lifting thrust is diminished). Further, as the air rushes along the lower surface 25 (see FIGURE 2) of the upper closure 17 there is a negative pressure effected over a substantially large area measured from the center of the upper closure. Since the air on the upper surface 27 of the upper closure 17 is at approximately atmospheric pressure during hovering or vertical flight, there results a differential of pressure which would tend to exert a force in opposition to a vertical thrust.

Figure 5:
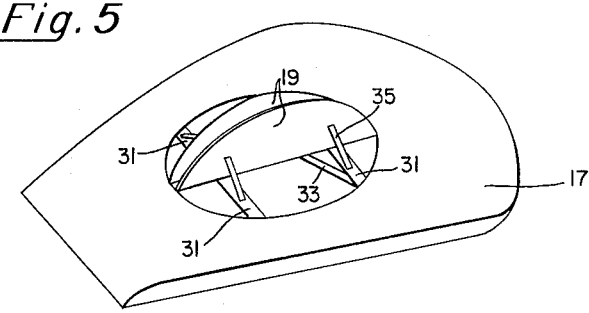
FIG. 5 is a pictorial of the upper closure depicting an open center portion.
Figure 4:
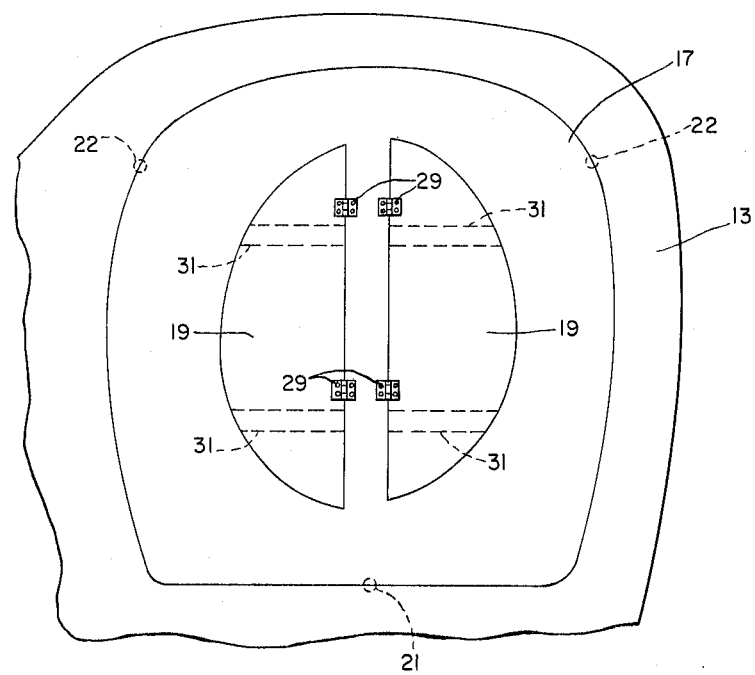
FIG. 4 is a plan view of the upper closure showing a center portion capable of being opened.

In order to overcome the choking phenomenon and the pressure differential a hinged cut-out 19, as can be best seen in FIGURES 4 and 5, is provided. As was explained earlier, when the cut-out 19 is open a sufficient amount of air can be supplied to the rotor duct to enable the rotors to continually move the air downwardly through the duct and hence continually impart vertical thrust to the aircraft. The cut-out 19 is opened so that the half-panel thereof nearest an obstruction, such as a fuselage in a low wing aircraft, is opened more than the half-panel away from the fuselage. This last-described arrangement is desirable since the fuselage itself (in a fan-in-wing embodiment) blocks part of the air being pulled between the upper closure 17 and the wing 13. The air blocked by the fuselage tends to partially choke the rotors but by providing the extra opening in the cut-out 19 on the fuselage side this "fuselage-caused" choking is minimized or eliminated. It should be understood that although a hinged center cut-out is depicted as the center opening means, other means such as louvers, sliding panels, etc. can be employed.

In FIGURE 4 the top view of the upper closure 17 is shown. The cut-out 19 is shown operably connected to the upper closure 17 by hinges 29. The struts 31 (shown in phantom) are included for strengthening the opening structure. While hinges 29 are depicted as a means for operably connecting the cut-out 19 to upper closure 17, it should be understood that other means which would enable the cut-out to be opened might well be employed. In a preferred embodiment the diameter of cut-out 19 is substantially equal to the diameter of the rotor swept area.

FIGURE 5 shows a pictorial of the open cut-out 19 depicting a rod system for opening the same. The rod 33 (and its counter-part at each strut 31) is moved by hydraulic power means up toward the strut 31 which forces the connected rod 35 to open the cut-out 19. Obviously other forms of linkage could be used and other forms of power, such as electric motors, could be used to actuate the rods 33.

It should be noted here that the preferred spacing of the drive rods 21 and 22 is as shown in FIGURES 1 and 4. The rods 21 and 22 and the hydraulic means 37 and 39 which drive them, are not shown in their preferred position in FIGURES 2, 3A, 3B and 3C, in order that the operation of the rods with the upper closure 17 can clearly be illustrated and described. In FIGURE 2 the upper closure 17 is shown in its closed position and further shown in phantom in its raised position. The rods 21 and 22 are also shown in the closed and raised (in phantom) positions.

Let us examine now the effect of the upper closure 17 in its raised position. The forward driving rod 22 pushes the leading edge of the upper closure 17 higher than the trailing edge (relative to the wing chord line) so that it is at a positive angle of attack. By virtue of the position of the upper closure, relative to the free airstream, the aircraft acquires "additional" lift during the transition from vertical flight to horizontal flight, even if the wing or body in which the fan is submerged is at a zero or negative angle of attack. The "additional" lift is suggested in the sense that if the upper closure 17 were held parallel to the wing 13, the angle of attack would not be as advantageous. The upper closure acts in a manner similar to an additional wing whose useful area is somewhat greater than that portion of the area of the wing displaced by the rotor disk, i.e., $S$ upper closure $> S$ duct, where $S$=area. In effect the upper closure 17, when raised and positioned, acts to increase the area factor, $S$, in the fundamental aerodynamic lift equation, $L=qSC_L$, where $L$ is lift, $q$ is dynamic pressure and $C_L$ is the coefficient of lift. Assuming that the dynamic pressure, $q$, remains the same for comparative conditions of submerged-fan aircraft, with or without upper closure, and that the coefficient of lift, $C_L$, remains for all practical purposes constant, the lift $L$ increases by increasing the effective wing area ($S$ normal–$S$ duct), i.e., by the inclusion of the upper closure area when the upper closure is elevated and at a positive angle of attack. This "additional" lift resulting from the aerodynamic lift of the upper closure 17 (which is in excess of the lift obtainable from the wing with simply the opening in it) reduces the requirements for rotor thrust during transition from vertical to horizontal flight. Consequently, the engine power can be diverted from the lifting rotor blades to the forward flight propulsion means. Also, by disposing the upper closure 17 at a positive angle and placing the wing at a negative angle there is a reduction in the rotor ram drag because of the rearward tilt of the rotor axis. The ram drag would be high without the presence of the upper closure. In addition, the presence of the upper closure 17 in proximity to the inlet lip 40 (FIGURE 2) helps generate a more negative pressure at that point, lip area 40, than would have been present without the upper closure 17 and a more negative pressure results in more lift on the wing itself.

As mentioned earlier another feature of the present invention is the provision of the flaps 26 (one flap each wing) shown in FIGURE 2. The flap 26 is a hinged or pivoted member connected to the wing structure 13. The flaps (flap 26 and its counterpart on the other wing) perform the same function of increasing wing camber and consequently increasing lift on the fan-in-wing aircraft as on conventional fixed-wing aircraft equipped with these devices. In addition, however, in VTOL flight of the submerged-fan aircraft the flaps serve to counteract the forward shift of the center of lift which results from the effect of the ducted fan system. In order to accomplish the counteraction the flaps 26 are deployed through an angle principally in transition flight as will be explained more fully below.

As the VTOL aircraft's ducted fan system is set in motion, its center of lift position is the product of the rotor action and of the suction effect of air rushing over the duct inlet lip 40. This positioning of the center of lift results in an undesirable nose-up pitching moment on the VTOL aircraft. However, when flaps 26 are used in conjunction with the ducted-fan system, its effect is to introduce a nose-down pitching moment. Such a nose-down pitching moment tends to counteract the earlier mentioned undesirable pitch-up moment, thereby effecting a rearward shift of the center-of-lift to a position substantially close to the rotor-lift center. The use of the upper closure 17, depending on its angle of attack, also accomplishes a desirable rearward movement of the center-of-lift. However, the rearward movement of the center-of-lift resulting from employing the upper closure 17 is not as effective as that accomplished by deploying the flaps 26. In combination the flaps 26 and the ducted-fan system provides an effective hovering control system for the VTOL aircraft.

When the aircraft commences to move in a forward direction at the beginning of the transition from vertical flight to horizontal flight, the louvers 15 (FIGURE 2) are deployed at an angle between completely-open and completely-closed. By disposing the louvers 15 at the angle just described during this maneuver, a forward thrust component is derived from the airflow leaving the duct and being deflected rearward by the inclined louvers 15. As the horizontal speed is increased to aerodynamic flying speed, i.e., where the aircraft can be sustained in horizontal flight by the aerodynamic forces acting on the wing system alone, the cut-out 19 is closed; and the upper closure 17 is lowered and fitted over the duct opening 11 to form a smooth, continuous upper wing surface. Immediately thereafter the power to drive the submerged rotors is cut-off and directed to the forward-flight propulsion means. As the rotor power is cut off, the louvers 15 are almost fully retracted leaving but a small crack opening. As the rotors slow down to a stop, the air pressure builds up, due to the still turning rotors, and is relieved through the small openings in the louvers 15. Thereafter when the wing rotors have stopped turning, the louvers are completely closed and the flaps 26, if employed, are fully retracted. The aircraft is then able to attain speeds comparable with conventional aircraft of the same types. For instance the specific airplane of the type shown in FIGURE 1 flies in a horizontal direction at speeds of between 300 to 400 miles per hour. The landing procedure is virtually the reverse of the above with the emphasis on getting the aircraft in such condition as to hover and then land vertically.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A duct opening cover means for use with a submerged ducted-rotor system of a VTOL aircraft comprising in combination:

an upper closure member formed to fit over the duct opening of said ducted rotor system and formed to provide an additional lifting effect when raised upward and away from said ducted rotor in conjunction with a horizontal movement of said VTOL aircraft;

said upper closure member further having a removable portion movably connected to said upper closure member in order to prevent choking the rotors of said ducted-rotor system and in order to mitigate the dissimilarities of air pressure between the top and the bottom surfaces of said upper closure member;

and moving means to be secured to said aircraft and connected to said upper closure member to lift said upper closure member as a complete entity upward away from said duct opening.

2. A duct opening cover means for use with a submerged ducted-rotor system of a VTOL aircraft comprising in combination:

an upper closure member formed to snugly fit over the upper side of the duct opening of said ducted rotor system and formed to provide an additional lifting effect when raised upward and away from said ducted rotor in conjunction with a horizontal movement of said VTOL aircraft;

said upper closure member further having a removable portion movably coupled to said upper closure to be operated to provide an opening in said upper closure member in order to prevent choking the rotors of said ducted-rotor system and in order to mitigate the dissimilarities of air pressure between the top and the bottom surfaces of said upper closure member;

moving means to be secured to said upper closure member to lift said upper closure member as a complete entity upward away from said duct opening;

and louver means movably connected to the lower side of said duct opening, said louver means to be opened on vertical flight and closed during horizontal flight.

3. A duct opening cover means for use with a submerged ducted-rotor system of a VTOL aircraft comprising in combination:

an upper closure member having a specific portion thereof formed to fit into a groove at the leading edge of the duct opening of said ducted rotor system and formed to provide an additional lifting effect when raised upward and away from said ducted rotor in conjunction with a horizontal movement of said VTOL aircraft;

a plurality of hydraulic lifts to be secured to said aircraft and connected to said upper closure member to lift said upper closure member out of said groove and upward away from said duct opening, at least one of said hydraulic lifts to be secured toward the leading edge of said duct opening having a push rod which lifts the leading edge portion of said upper closure member further above said duct opening than the trailing edge portion of said upper closure member is lifted.

4. A duct opening cover means according to claim 3 wherein there is further included in said upper closure member, an operable cut-out means movably coupled thereto and to be operated to provide an opening in said upper closure in order to prevent choking said rotor system and in order to mitigate the dissimilarities of air pressure between the top and the bottom surfaces of said upper closure member.

5. A duct opening cover means according to claim 4 wherein said cut-out means is substantially circular in shape and hinged along approximately the diameter thereof.

6. In a vertical take-off and landing aircraft the combination according to claim 10 wherein there are included means to open the portion of said center cut-out means close to the fuselage of said aircraft a greater distance than the other portion of said center cut-out means.

7. A flight maneuvering control system for use with a VTOL aircraft employing at least one submerged ducted-rotor system comprising in combination:

an upper closure member formed to fit snugly over the upper side of the duct opening of said ducted rotor system;

said upper closure member further having a removable portion movably connected to said upper closure to be operated to provide an opening in said upper closure member in order to prevent choking the rotors of said ducted-rotor system;

flap members operably connected to said aircraft and disposed on the trailing edge side of said duct opening to operate in conjunction with said upper closure member to adjust the center of lift of said aircraft;

and lifting means to be secured to said aircraft and connected to said upper closure member to lift said upper closure member upward away from said duct opening.

8. A flight maneuvering system according to claim 7 wherein said lifting means includes means to lift the leading edge portion of said upper closure member further above said duct opening than the trailing edge portion of said upper closure member is lifted.

9. A flight maneuvering system according to claim 8 wherein said upper closure member has a specific portion of its leading edge formed to fit into a groove at the leading edge of the duct opening of said ducted-rotor system.

10. In a vertical take-off and landing aircraft the combination of a wing;

a submerged ducted rotor system in said wing;

an upper closure member formed to fit over the duct opening of said ducted-rotor system;

operating means secured to said wing and connected to lift said upper closure member upward away from said duct opening;

said upper closure member including a movable center cut-out means which can be opened in order to prevent choking the rotors of said ducted rotor system.

References Cited in the file of this patent
UNITED STATES PATENTS

| 2,718,364 | Crabtree | Sept. 20, 1955 |
| 2,936,969 | Griffith | May 17, 1960 |
| 2,945,642 | Nofi | July 19, 1960 |
| 3,080,137 | Hurel | Mar. 5, 1963 |
| 3,099,423 | Wilde | July 30, 1963 |